(12) United States Patent
Wang (10) Patent No.: US 11,565,361 B2
(45) Date of Patent: Jan. 31, 2023

(54) BLADE CLEANER

(71) Applicant: Henry Wang, Winter Springs, FL (US)

(72) Inventor: Henry Wang, Winter Springs, FL (US)

( * ) Notice: Subject to any disclaimer, the term of this patent is extended or adjusted under 35 U.S.C. 154(b) by 0 days.

(21) Appl. No.: 17/554,875

(22) Filed: Dec. 17, 2021

(65) Prior Publication Data

US 2022/0212302 A1 Jul. 7, 2022

Related U.S. Application Data

(60) Provisional application No. 63/134,744, filed on Jan. 7, 2021.

(51) Int. Cl.
*B23Q 11/02* (2006.01)
*B23D 59/00* (2006.01)
*B08B 1/00* (2006.01)
*B08B 3/04* (2006.01)

(52) U.S. Cl.
CPC .............. *B23Q 11/02* (2013.01); *B08B 1/001* (2013.01); *B08B 3/04* (2013.01); *B23D 59/006* (2013.01)

(58) Field of Classification Search
None
See application file for complete search history.

(56) References Cited

U.S. PATENT DOCUMENTS

| | | | |
|---|---|---|---|
| 228,410 A | 6/1880 | Squintani | |
| 503,726 A | 8/1893 | Pryibil | |
| 1,272,659 A | 7/1918 | Groomes | |
| 1,432,822 A * | 10/1922 | Wood | B25B 11/002 81/419 |
| 2,164,615 A | 7/1939 | Mafera | |
| 2,524,961 A | 10/1950 | Cramer, Jr. | |
| 2,710,633 A | 6/1955 | Oberg | |
| 2,759,503 A | 8/1956 | Goldschmidt | |
| 3,171,632 A | 3/1965 | Jines | |
| 3,735,206 A | 5/1973 | Pesek | |
| 4,185,528 A * | 1/1980 | Andersen | B26D 7/088 83/887 |
| 4,354,770 A | 10/1982 | Block | |
| 4,971,570 A | 11/1990 | Tolle et al. | |
| 5,038,486 A | 8/1991 | Ducate, Sr. | |
| 5,097,601 A | 3/1992 | Pollak et al. | |
| 5,207,007 A | 5/1993 | Cucinotta et al. | |
| 5,220,485 A | 6/1993 | Chakrabarti | |
| 5,275,074 A | 1/1994 | Taylor et al. | |
| 5,334,254 A * | 8/1994 | Gelardi | G11B 23/505 134/25.4 |
| 5,379,669 A | 1/1995 | Roedig | |
| 5,382,175 A | 1/1995 | Kunkel | |
| 5,402,581 A | 4/1995 | Hurd et al. | |
| 5,472,353 A | 12/1995 | Hristake et al. | |
| 5,617,909 A | 4/1997 | Duginske | |
| 5,735,054 A | 4/1998 | Cole | |
| 5,804,507 A * | 9/1998 | Perlov | B24B 37/04 438/692 |

(Continued)

*Primary Examiner* — Eric W Golightly
*Assistant Examiner* — Arlyn I Rivera-Cordero
(74) *Attorney, Agent, or Firm* — Wolter Van Dyke Davis, PLLC; Robert L. Wolter (57) ABSTRACT

An apparatus (100), including: a base (102) configured to retain a liquid therein; an abrasive mat (200) configured to rest on a bottom of the base and to support a saw blade in a horizontal orientation; and a blade slot (612) configured to hold the saw blade in a vertical orientation.

24 Claims, 10 Drawing Sheets

(56) References Cited

U.S. PATENT DOCUMENTS

| | | | |
|---|---|---|---|
| 5,849,104 A * | 12/1998 | Mohindra | H01L 21/02052 |
| | | | 257/E21.228 |
| 5,941,514 A | 8/1999 | Burcaw | |
| 6,195,905 B1 | 3/2001 | Cole | |
| 6,237,457 B1 | 5/2001 | Taylor | |
| 6,502,492 B1 | 1/2003 | Krohmer et al. | |
| 6,532,679 B2 | 3/2003 | Cole | |
| 6,672,190 B2 | 1/2004 | Taylor | |
| 6,691,423 B2 | 2/2004 | Fontaine | |
| 6,766,550 B1 * | 7/2004 | Koch | G11B 23/40 |
| 6,776,076 B2 | 8/2004 | Salazar | |
| 7,245,199 B1 | 7/2007 | Reilly | |
| 7,505,251 B2 | 3/2009 | Canfield et al. | |
| 7,997,313 B2 | 8/2011 | Wang | |
| 8,096,219 B2 | 1/2012 | Potter | |
| 2002/0102919 A1 * | 8/2002 | Lalli | G11B 23/505 |
| | | | 451/41 |
| 2008/0054657 A1 * | 3/2008 | Chalom | H01L 21/68707 |
| | | | 294/104 |
| 2018/0036905 A1 | 2/2018 | Frolov | |
| 2019/0337023 A1 * | 11/2019 | Kirmuss | B08B 11/02 |

* cited by examiner

BLADE CLEANER

FIELD OF THE INVENTION

The invention relates to a device suitable for cleaning pitch and gum buildup from the teeth of a saw blade and a router bit

BACKGROUND OF THE INVENTION

Saw blades used to cut wood often see a buildup of pitch and gum on the teeth of the saw blade. The buildup of pitch and gum must be removed periodically so that the pitch and gum do not interfere with the cutting action of the blade. Many woodworkers clean their blades by first soaking the blade in a solution suited for removing the pitch and gum. They then use a wire brush and go over every tooth on one side then flip the blade over to repeat same process on the other side. This process requires a lot time because there are many teeth to be cleaned. As a result, many woodworkers do not clean their saw blades as often as would be optimal. This results in cuts with saw marks and burns. These saw marks can mislead the woodworker into thinking the blade is dull and to send the blade out for re-sharpening. However, re-sharpening is expensive and can change the width, geometry, and/or the angle of the teeth, which is not ideal. Hence, there is room in the art for improvement.

BRIEF DESCRIPTION OF THE DRAWINGS

The invention is explained in the following description in view of the drawings that show.

DETAILED DESCRIPTION OF THE INVENTION

The present inventor has devised a unique and innovative apparatus that enables a user to clean a saw blade quickly and efficiently. The apparatus is self-contained and may include additional implements and associated compartments that can aid in the cleaning process. The apparatus may also enable a user to clean tools other than a saw blade, such as router bits, shaper cutters, and the like.

Figure 1:
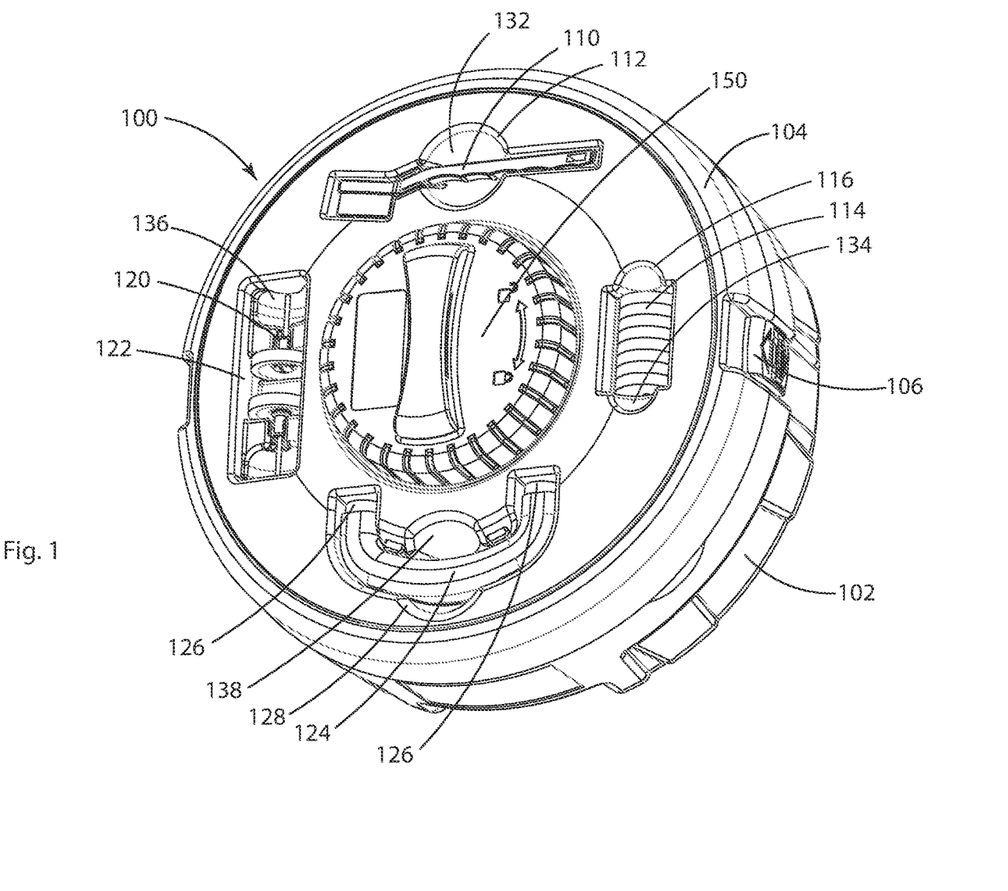
FIG. 1 is a perspective view of an example embodiment of a blade cleaning apparatus disclosed herein.

FIG. 1 is a perspective view of an example embodiment of a blade cleaning apparatus 100 disclosed herein. It includes a base 102 configured to retain a cleaning liquid therein, a lid 104 configured to be secured to the base 102 via latches 106, and a variety of tools and respective recesses in the lid 104 to store the tools. In this example embodiment, a brush 110 is disposed in a brush recess 112. Abrasive pads 114 suitable for a rotary tool such as a Dremel® are disposed in an abrasive pad recess 116. Abrasive pads 114 mounted on a tool bit 120 suitable for the rotary tool are disposed in a tool bit recess 122. A handle 124 having one or more magnets 126 is disposed in a handle recess 128. In alternate example embodiments, instead of magnets 126, the handle 124 may include suction cups or other temporary surface mounting hardware. An example handle is a GRRR-RIPPER handle made by MicroJig of Winter Park, Fla., with suitable magnets attached to the ends. Each recess has a respective grip-relief 132, 134, 136, 138 that enables a user to grip the respective tool when removing or replacing the tool from the recess. One or more of the recesses may be at least partly form fitting and/or may be configured to hold the respective tool therein via a press fit or a compressive fit or a snap-in fit between the tool and the walls that form the recess.

In an example embodiment, the blade cleaning apparatus 100 also includes a router bit cleaning feature that includes a router bit cleaning compartment lid 150 to which a router bit holder (not visible in FIG. 1) is secured and that covers a router bit cleaning compartment(not visible in FIG. 1).

Figure 2:
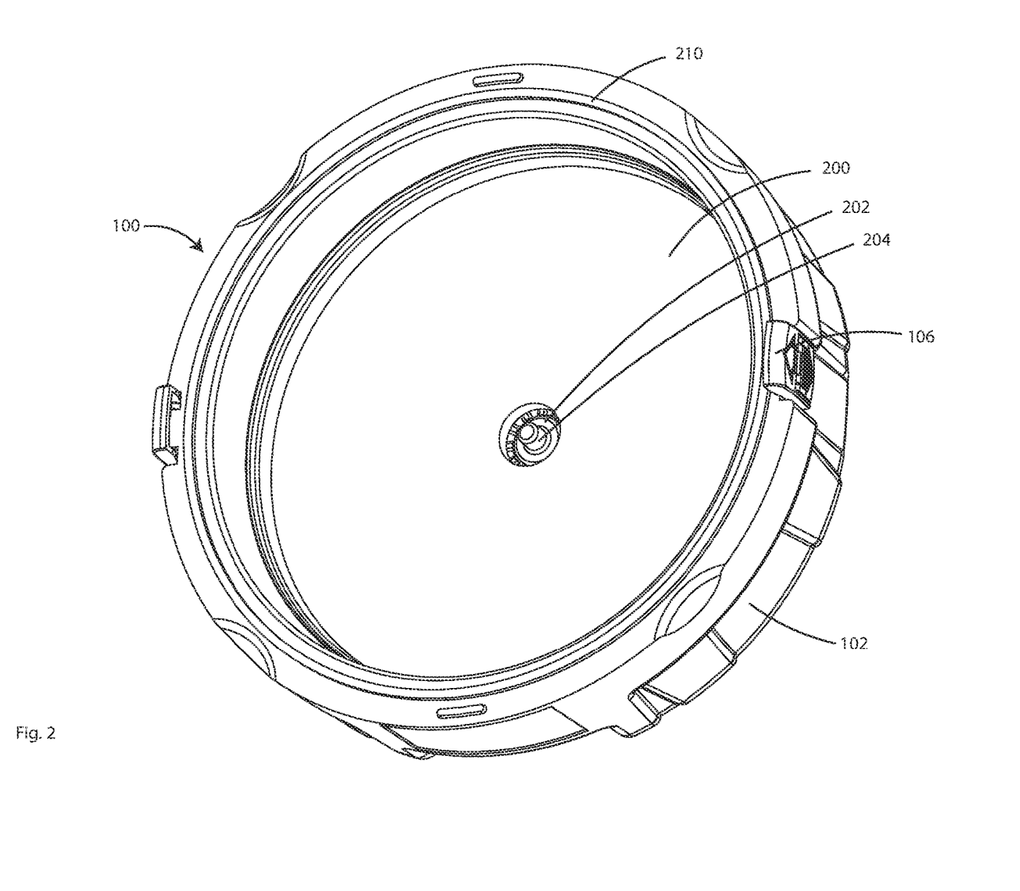
FIG. 2 is a perspective view of the blade cleaning apparatus of FIG. 1 with the lid removed.

FIG. 2 is a perspective view of the blade cleaning apparatus 100 with the lid 104 removed to expose an abrasive mat 200 configured to rest on a bottom 202 of the base 102 and to support a saw blade such as those used in table saws, miter saws, and circular saws in a horizontal orientation. In an example embodiment, the abrasive pad is or is comparable to a Scotch-Brite™ pad made by 3M. An example diameter is thirteen (13) inches in order to be able to clean a wide range of saw blade sizes. The base 102 includes a centering post 204 configured to protrude up through a center of the saw blade. In addition, in this example embodiment, a watertight seal is formed between the base 102 and the lid 104 via an O-ring 210 or another suitable element known to the artisan. In this example embodiment, the latches 106 are the type that secure the lid 104 to the base 102 by pulling the lid 104 down onto the base. This compresses the O-ring 210 to form the watertight seal configured to retain a liquid in the base 102.

Figure 3:
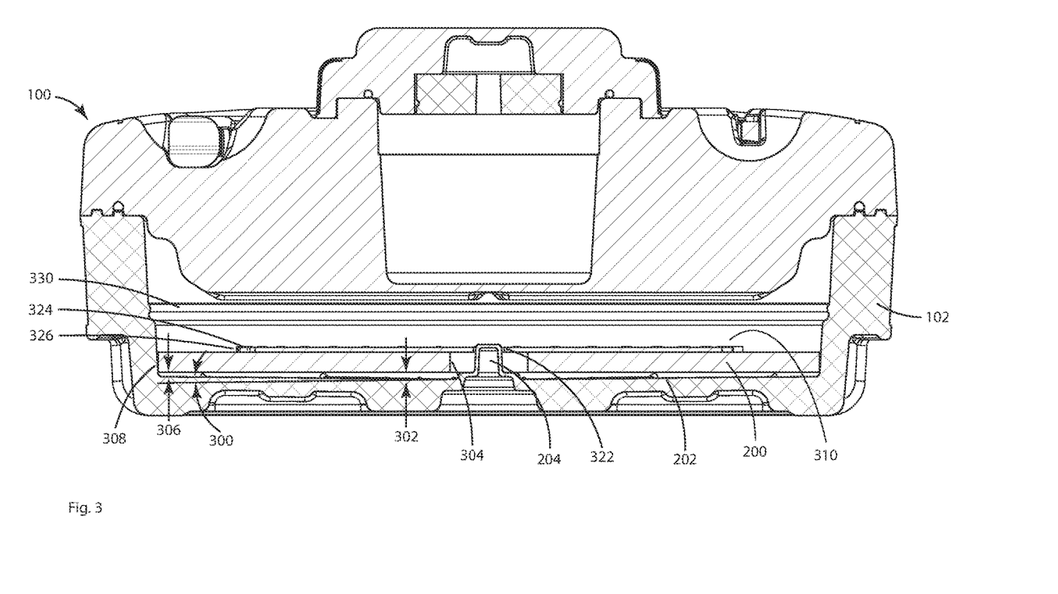
FIG. 3 is a side cross sectional view of the blade cleaning apparatus of FIG. 1.

FIG. 3 is a side cross sectional view of the blade cleaning apparatus 100 of FIG. 1. In an example embodiment, at least one of the base 102 and the abrasive mat 200 comprises a taper such that a perimeter of the saw blade resting thereon is supported whereas a center of the saw blade is not supported. In this example embodiment, the bottom 202 of the base 102 is angled at an angle 300 so that a distance 302 at a radially inner edge 304 of the abrasive mat 200 is larger than a distance 306 at a radially outer edge 308 of the abrasive mat 200. The abrasive mat 200 is shown as flat and horizontal. The saw blade 310 rests in a horizontal orientation atop the abrasive mat 200 and the centering post 204 protrudes up through a center 322 of the saw blade 310. Due to the angle 300 and the flexible nature of the abrasive mat 200, teeth 324 (e.g. carbide teeth) disposed at the perimeter 326 of the saw blade 310 are supported by the abrasive mat 200 while the center is not likewise supported. A cleaning solution liquid is disposed in the bottom 102 and the saw blade 310 is submerged below a surface 330 of the liquid. Example liquids include Simple Green made by Sunshine Makers Inc., Pine Sol® made by Clorox®, laundry detergent, baking soda with water, and even plain water.

Figure 3A:
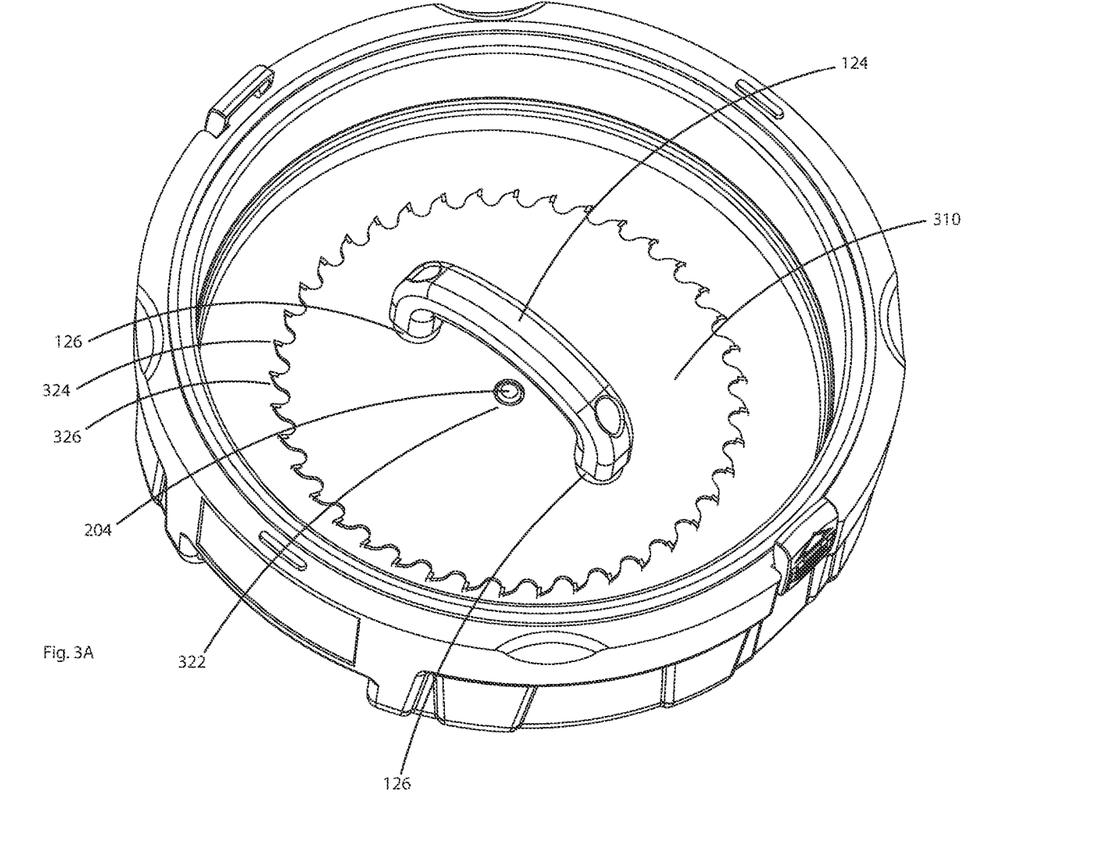
FIG. 3A a perspective view of the blade cleaning apparatus of FIG. 1 with the lid removed and a saw blade disposed therein.

As can be seen in FIG. 3A, the handle 124 can be used to handle the saw blade 310. In an example embodiment, the magnets 126 generate about ten pounds of pull force on the saw blade 310. By placing the handle 124 on the side of the saw blade 310, the saw blade 310 can be safely placed in the liquid to reach the configuration shown in FIG. 3 and FIG. 3A without the user having to touch either the saw blade or the cleaning liquid. The saw blade 310 may be left to soak for as little as under a minute, for example, twenty (20) seconds. The user can then press down gently. This causes the center of the saw blade 310 to flex down, at which time the user can merely spin/rotate the saw blade 310 about the centering post 204 for as little as a quarter to half a turn to remove the pitch and gum. Because the perimeter 326 of the saw blade 310 is supported and the center 322 is not, pressing down gently on the saw blade 310 increases a contact force between the teeth 324 and the abrasive mat 200. The spin action translates the teeth across the abrasive mat 200 which abrades the pitch and gum off all of the teeth 324 simultaneously in about ten (10) to fifteen (15) seconds. The saw blade 310 can be flipped and the process can be repeated to clean the other side of the teeth 324. Accordingly, a user can clean a saw blade 310 in this manner much quicker and easier compared to prior art techniques.

Figure 4:
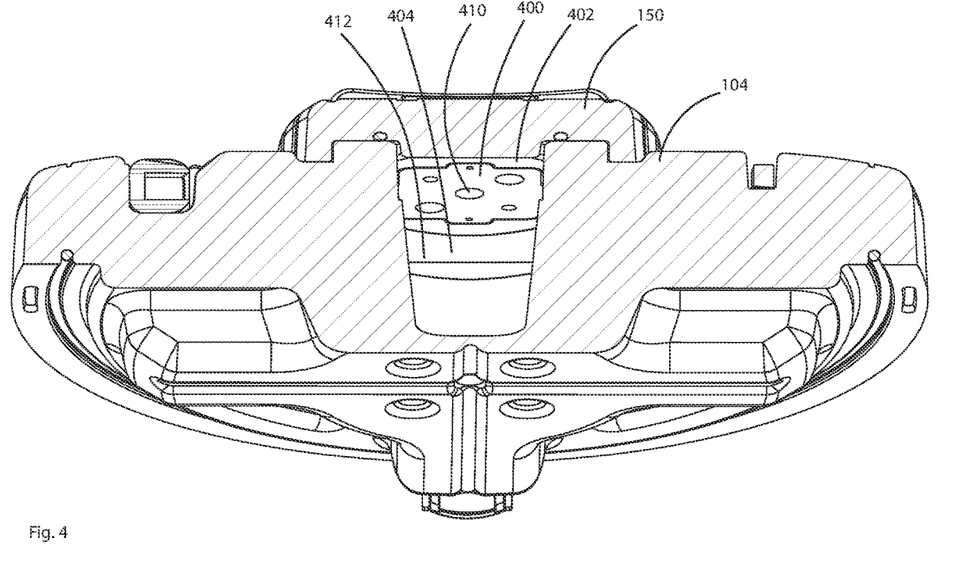
FIG. 4 is a perspective view from below of a cross section of the blade cleaning apparatus of FIG. 1 showing the router bit cleaning compartment.

FIG. 4 is a perspective view from below of a cross section of the blade cleaning apparatus 100 showing the router bit cleaning compartment lid 150, a router bit holder 400 secured to an underside 402 of the router bit cleaning compartment lid 150, and a router bit recess 404 in an exterior surface of the lid 104. In example embodiments, the router bit holder 400 may be composed of a resilient material (e.g. rubber, foam etc.). A base of a router bit can be inserted into a bit receptacle 410 so that the router bit holder 400 is held upside down in the router bit recess 404. A cleaning solution liquid may be disposed in the router bit recess 404 so that a tip of the router bit is disposed below a surface 412 of the liquid. The router bit may be left to soak until it is removed and may additionally be manually cleaned using, for example, any of the tools secured in the lid 104 and/or the rotary tool.

Figure 5:
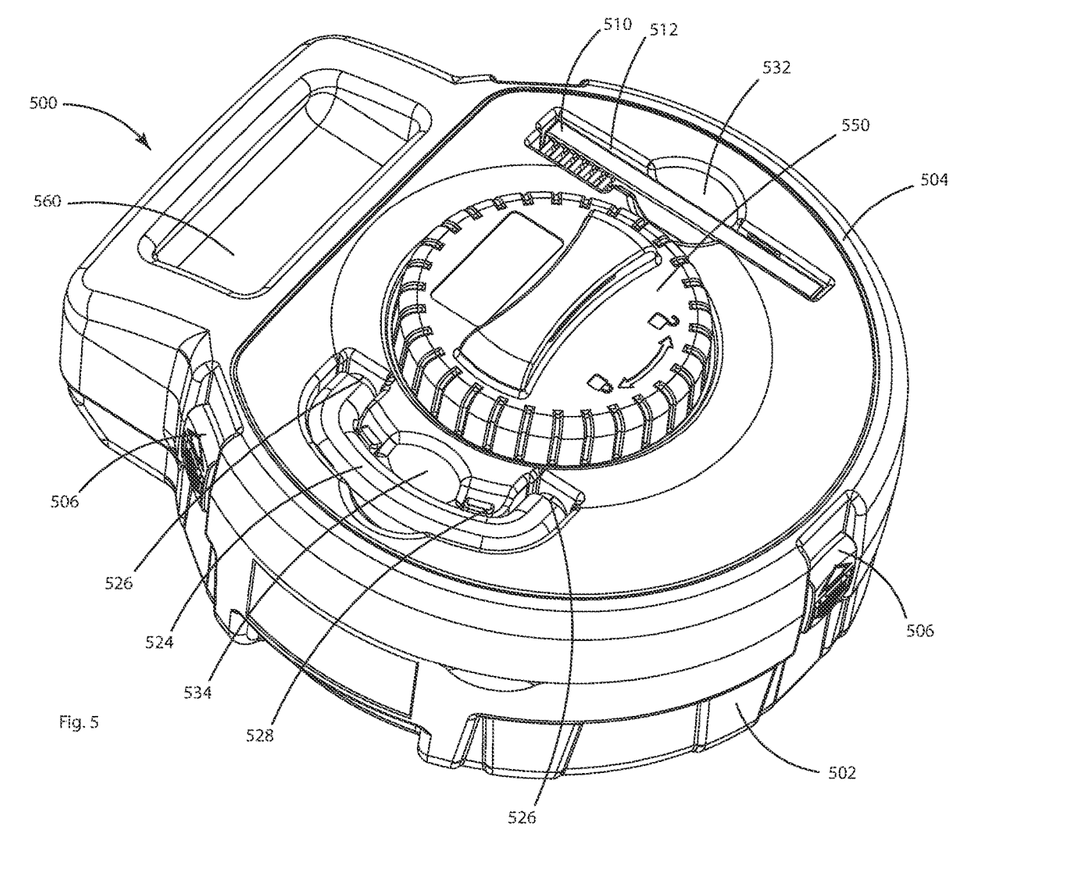
FIG. 5 is a perspective view of another example embodiment of the blade cleaning apparatus disclosed herein.

FIG. 5 is a perspective view of another example embodiment of the blade cleaning apparatus 500 disclosed herein. It likewise includes a base 502 configured to retain a liquid therein, a lid 504 configured to be secured to the base 502 via latches 506, and a variety of tools and respective recesses in the lid 504 to store the tools. In this example embodiment, a brush 510 is disposed in a brush recess 512, and a handle 524 having one or more magnets 526 is disposed in a handle recess 528. In alternate example embodiments, instead of magnets 526, the handle 524 may include suction cups or other temporary surface mounting hardware. Each recess has a respective grip-relief 532, 534, that enables a user to grip the respective tool when removing or replacing the tool from the recess. One or more of the recesses may be at least partly form fitting and/or may be configured to hold the respective tool therein via a press for or a compressive fit or a snap-in fit between the tool and the walls that form the recess. In this example embodiment, the blade cleaning apparatus 500 also includes a router bit cleaning feature that includes a router bit cleaning compartment lid 550 to which a router bit holder (not visible in FIG. 5) is secured and that covers a router bit cleaning compartment(not visible in FIG. 5). Also visible is an upper grip recess 560 that cooperates with a lower grip recess (see FIG. 9) to enable a user to easily grab and carry the blade cleaning apparatus 500.

Figure 6:
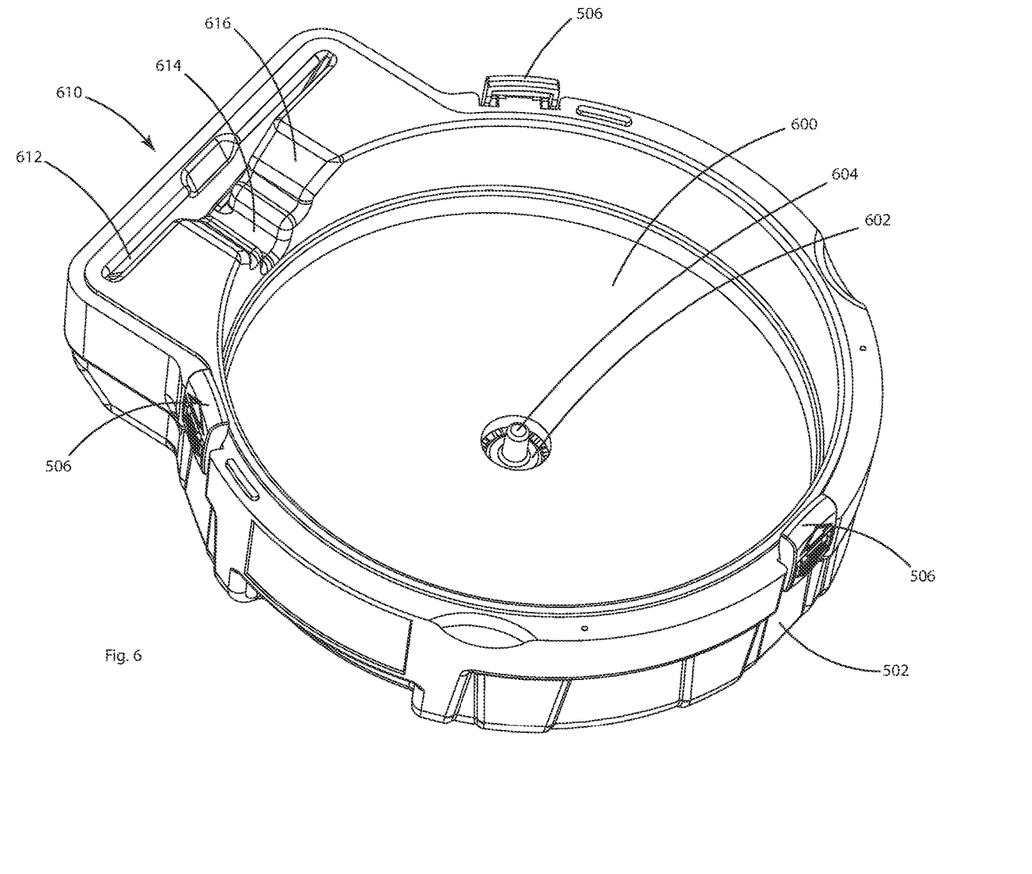
FIG. 6 is a perspective view of the blade cleaning apparatus of FIG. 5 with the lid removed.

FIG. 6 is a perspective view of the blade cleaning apparatus 500 of FIG. 5 with the lid 504 removed to expose an abrasive mat 600 configured to rest on a bottom 602 of the base 502 and to support the saw blade. In this example embodiment, the base 502 includes a centering post 604 configured to protrude up through a center of the saw blade. In addition, in this example embodiment, a watertight seal is formed between the base 502 and the lid 504 via an O-ring or another suitable element known to the artisan. The latches 606 in this example embodiment are the type that secure the lid 504 to the base 502 by pulling the lid 504 down onto the base. This compresses the O-ring to form the watertight seal configured to retain a liquid in the base 502.

Also visible is a saw blade holding station 610 including a blade slot 612 configured to hold the saw blade in a vertical orientation. The blade slot 612 shown has a rounded shape to conform to the perimeter of the saw blade. The saw blade may be placed in the blade slot 612 to dry after cleaning. The blade slot 612 may also be used to safely hold the saw blade while the user moves the handle 524 from one side of the saw blade to the other without the user's hand touching the saw blade and/or cleaning chemicals. Any liquid pulled by gravity into the blade slot 612 may drain from the blade slot 612 into the base 502 via a drain 614. A recess 616 adjacent the blade slot 612 can receive the handle 524 when the saw blade is lowered into the blade slot 612. Having the handle 524 disposed toward the bottom of the upright saw blade in the blade slot 612 enables a user to pull/pry the handle 524 from the saw blade while the blade slot 612 holds the saw blade in place. The embodiment of FIG. 6 may include some or all of the same features of the embodiment of FIG. 1 in addition to the saw blade holding station 610. Likewise, the embodiment of FIG. 1 may include the saw blade holding station 610 of FIG. 6.

Figure 7:
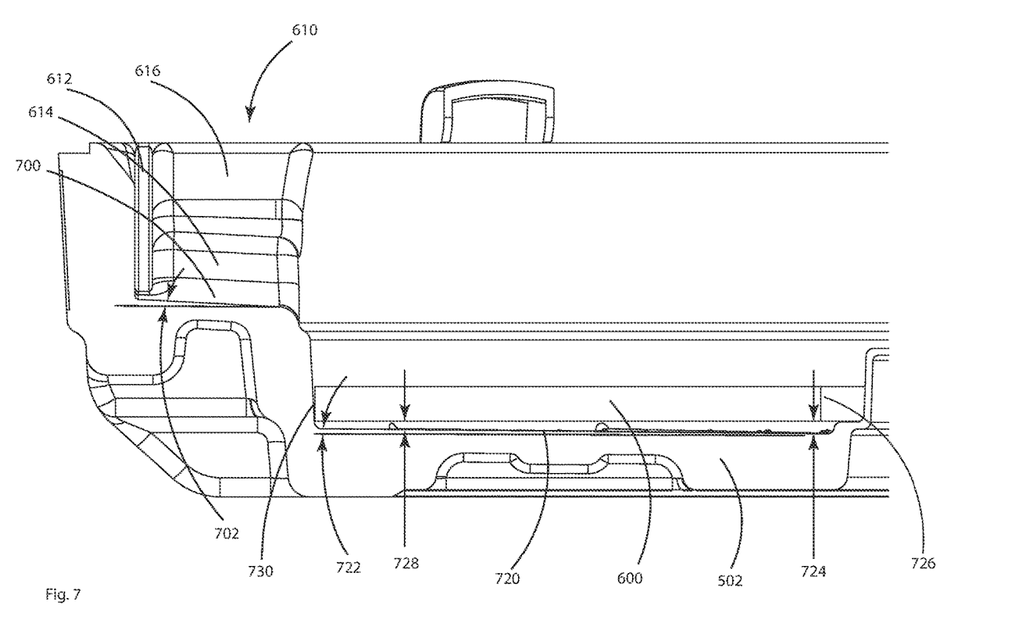
FIG. 7 is a side cross sectional view of a blade holding station of the blade cleaning apparatus of FIG. 5.

FIG. 7 is a side cross sectional view of the saw blade holding station 610 of the blade cleaning apparatus 500 of FIG. 5. In this example embodiment, any fluid from the blade slot 612 will enter the drain 614 via gravity and will then drain into the bottom 502 because a bottom 700 of the drain 614 is sloped at an angle 702 into the bottom 502. It can also be seen that, like the embodiment of FIG. 1, the bottom 720 of the base 502 is angled at an angle 722 so that a distance 724 at a radially inner edge 726 of the abrasive mat 600 is larger than a distance 728 at a radially outer edge 730 of the abrasive mat 600.

Figure 8:
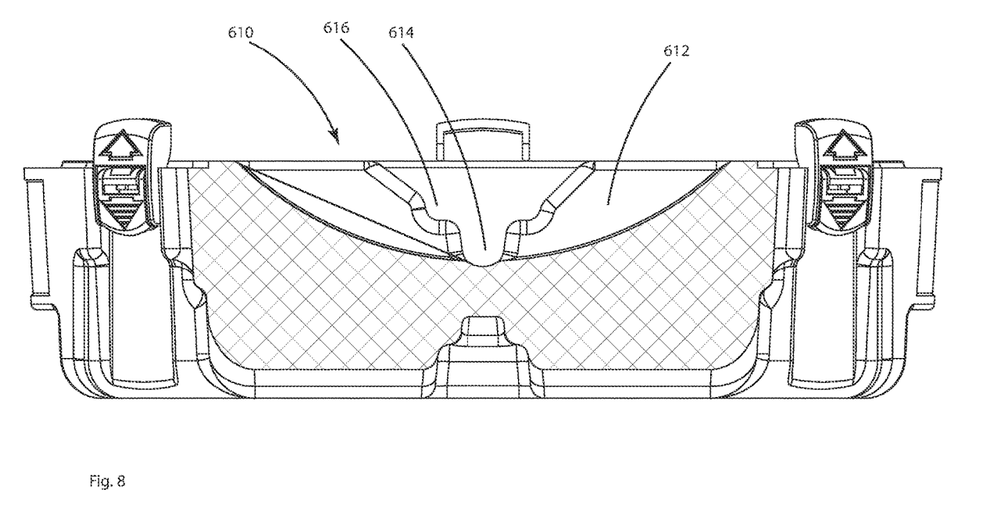
FIG. 8 is another side cross sectional view of the blade holding station of the blade cleaning apparatus of FIG. 5.

FIG. 8 is another side cross sectional view of the saw blade holding station 610 the blade cleaning apparatus 500 showing the arcuate shape of the blade slot 612. In example embodiments, the arcuate shape can match that of the saw blade, such as but not limited to 4.5 to 7.25 inches for handheld circular saw blades, and seven (7) or ten (10) inch saw blades for table and miter saws.

Figure 9:
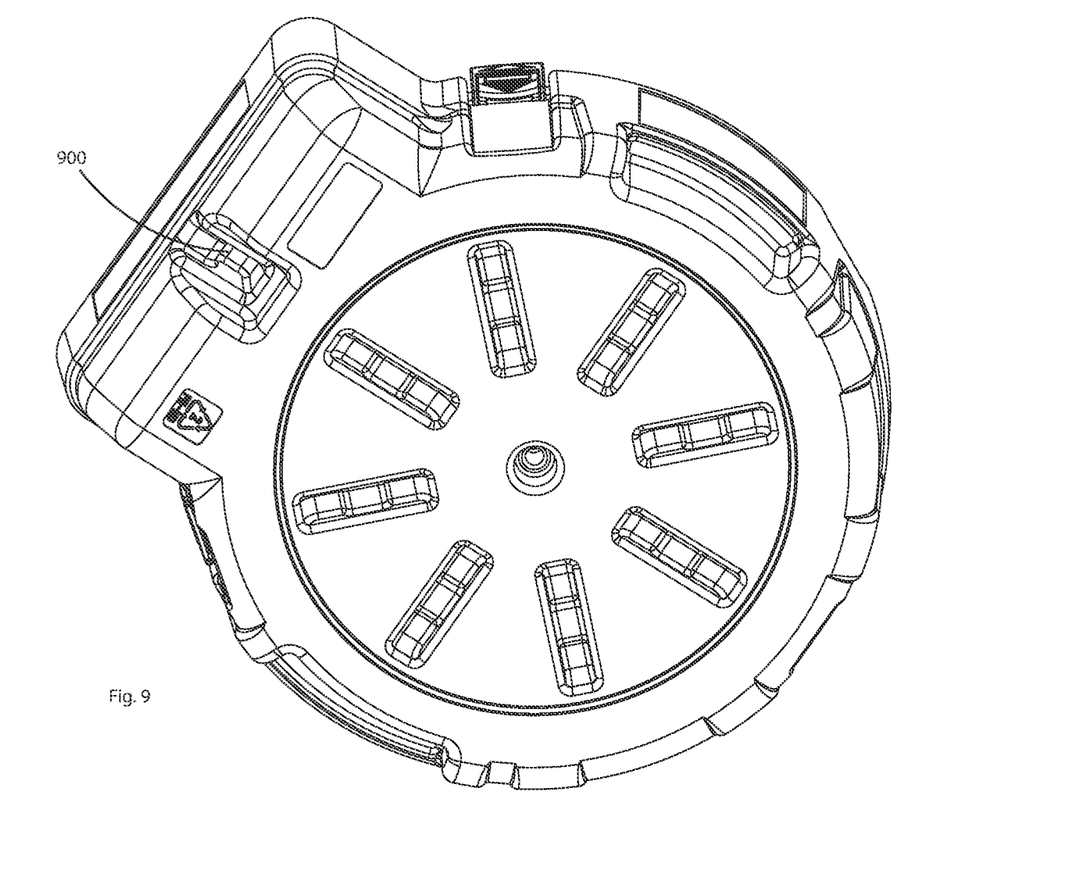
FIG. 9 is a perspective view showing a grip of the blade cleaning apparatus of FIG. 5.

FIG. 9 is a perspective view showing the lower grip recess 900 of the blade cleaning apparatus 500 of FIG. 5. The lower grip recess 900 cooperates with the upper grip recess 560 to enable a user to carry the blade cleaning apparatus 500. For example, a user may put a thumb in the lower grip recess 900 and one or more fingers in the upper grip recess 560 and thereby be able to hold and carry the blade cleaning apparatus 500.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. A method, comprising:
cleaning a saw blade using an apparatus comprising a base comprising a bottom and a sidewall that collectively form a watertight basin configured to retain a pool of liquid therein; a centering post sized to protrude up from the bottom through a center of a saw blade; and an abrasive mat configured to rest the bottom of the base and to support the saw blade in a horizontal orientation; wherein the bottom comprises a lower central portion disposed radially closer to the centering post and-an elevated perimeter portion disposed between the lower central portion and the sidewall; and wherein when the abrasive mat is disposed on the bottom and the saw blade is disposed on the abrasive mat, the abrasive mat is configured to support a perimeter of the saw blade while leaving a body of the saw blade unsupported, resting the saw blade flat on the abrasive mat, and rotating the saw blade to translate teeth of the saw blade across the abrasive mat by using a handle secured to a face of a radially extending side of the saw blade to manipulate the saw blade, wherein the handle comprises a magnet or a suction cup that secures the handle to the saw blade.

2. An apparatus, comprising:
a base configured to form a reservoir to retain a pool of liquid therein;
a centering post sized to protrude up through a center of a saw blade;
an abrasive mat configured to rest on a bottom of the base and to support the saw blade in a horizontal orientation, wherein the bottom comprises a lower central portion disposed radially closer to the centering post and an elevated perimeter portion disposed radially outside thereof; and wherein when the abrasive mat is disposed on the bottom and the saw blade is disposed on the abrasive mat, the abrasive mat is configured to support a perimeter of the saw blade while leaving a body of the saw blade unsupported; and
a detachable handle retained on a lid or the base and comprising a magnet configured to secure the handle to the saw blade and thereby lift and position the saw blade.

3. An apparatus, comprising:
a base configured to retain a liquid therein;
an abrasive mat configured to rest on a bottom of the base and to support a saw blade in a horizontal orientation;
a lid for the base;
a router bit recess in an exterior surface of the lid and configured to retain the liquid therein when the lid is in the horizontal orientation;
a router bit recess lid;
a handle comprising a magnet configured to secure the handle to the saw blade and thereby lift and position the saw blade, and
a recess in the exterior surface of the lid configured to retain the handle therein.

4. The apparatus of claim 3, wherein one of the base and the abrasive mat comprises a taper such that a perimeter of the saw blade is supported whereas a center of the saw blade is not supported.

5. The apparatus of claim 3, wherein the base further comprises a blade slot configured to hold the saw blade in a vertical orientation, and a drain configured to drain fluid from the blade slot into the base.

6. An apparatus, comprising:
a base configured to retain a liquid therein;
an abrasive mat configured to rest on a bottom of the base and to support a saw blade in a horizontal orientation;
a lid for the base;
a router bit recess in an exterior surface of the lid and configured to retain the liquid therein when the lid is in the horizontal orientation;
a router bit recess lid; and
a router bit holder secured to an underside of the router bit recess lid, configured to receive a router bit shaft of a router bit, and to suspend the router bit in the router bit recess when the router bit recess lid is secured to the lid.

7. The apparatus of claim 6, further comprising at least one of:
a seal between the base and the lid configured to retain the liquid in the base; and
a router bit recess seal between the lid and the router bit recess lid configured to retain the liquid in the router bit recess.

8. The apparatus of claim 6, wherein one of the base and the abrasive mat comprises a taper such that a perimeter of the saw blade is supported whereas a center of the saw blade is not supported.

9. The apparatus of claim 6, wherein the router bit holder comprises a resilient material configured such that a resilience of the resilient material retains the router bit shaft therein.

10. The apparatus of claim 6, further comprising a handle comprising a magnet configured to secure the handle to the saw blade and thereby lift and position the saw blade.

11. The apparatus of claim 6, the base further comprising a blade slot configured to hold the saw blade in a vertical orientation.

12. The apparatus of claim 11, further comprising a drain configured to drain fluid from the blade slot into the base.

13. An apparatus, comprising:
a base comprising a bottom and a sidewall that collectively form a watertight basin configured to retain a pool of liquid therein;
a centering post sized to protrude up from the bottom through a center of a saw blade; and
an abrasive mat configured to rest on the bottom of the base and to support the saw blade in a horizontal orientation,
wherein the bottom comprises a lower central portion disposed radially closer to the centering post and an elevated perimeter portion disposed between the lower central portion and the sidewall; and wherein when the abrasive mat is disposed on the bottom and the saw blade is disposed on the abrasive mat, the abrasive mat is configured to support a perimeter of the saw blade while leaving a body of the saw blade unsupported.

14. The apparatus of claim 13, further comprising:
a lid configured to be secured to the base; and
a seal disposed between the base and the lid configured to form a watertight seal therebetween.

15. The apparatus of claim 13, further comprising a lid and a detachable handle retained on the lid or the base and comprising a magnet configured to secure the handle to the saw blade and thereby lift and position the saw blade.

16. The apparatus of claim 13, wherein the bottom comprises a funnel shape that is concentric with the centering post.

17. The apparatus of claim 13, further comprising a blade slot comprising a circular segment shape and configured to hold the saw blade in a vertical orientation.

18. The apparatus of claim 17, further comprising a drain configured to drain fluid from the blade slot into the watertight basin.

19. The apparatus of claim 13, further comprising:
   a lid for the base;
   a router bit recess in an exterior surface of the lid and configured to retain a liquid therein when the lid is in the horizontal orientation;
   a router bit recess lid; and
   a router bit recess seal between the lid and the router bit recess lid configured to retain the liquid in the router bit recess.

20. The apparatus of claim 19, further comprising a router bit holder secured to an underside of the router bit recess lid, configured to receive a router bit shaft of a router bit, and to suspend the router bit in the router bit recess when the router bit recess lid is secured to the lid.

21. The apparatus of claim 20, wherein the router bit holder comprises a resilient material configured such that a resilience of the resilient material retains the router bit shaft therein.

22. The apparatus of claim 13, further comprising:
   a detachable handle configured to secure the handle to the saw blade.

23. The apparatus of claim 22, further comprising a lid, and wherein the handle is secured to the lid.

24. The apparatus of claim 23, wherein the lid comprises a recess configured to retain the handle therein.

* * * * *